United States Patent [19]

Stegmüller

[11] Patent Number: 4,791,520

[45] Date of Patent: Dec. 13, 1988

[54] FAULT PROTECTION FOR A MEDIUM VOLTAGE TRANSFORMER BRANCH

[75] Inventor: Karl Stegmüller, Wiesent, Fed. Rep. of Germany

[73] Assignee: Sachsenwerk Aktiengesellschaft, Regensburg, Fed. Rep. of Germany

[21] Appl. No.: 23,414

[22] Filed: Mar. 9, 1987

[30] Foreign Application Priority Data

Mar. 8, 1986 [DE] Fed. Rep. of Germany ....... 3607675

[51] Int. Cl.$^4$ ............................................. H02H 7/04
[52] U.S. Cl. ..................................... 361/63; 361/64; 361/89; 361/102; 361/166
[58] Field of Search ................. 361/2, 3, 5, 35, 61–65, 361/67, 89, 91, 93–97, 102, 104, 166, 187, 197, 198, 191

[56] References Cited

U.S. PATENT DOCUMENTS 3,873,887  3/1975  Barkan et al. .................... 361/63 X
4,240,123 12/1980  Hotta ................................ 361/63 X
4,354,215 10/1982  Van der Scheer .................... 361/63

FOREIGN PATENT DOCUMENTS 1008387 10/1954  Fed. Rep. of Germany.
1948209  9/1969  Fed. Rep. of Germany.

OTHER PUBLICATIONS

"Kurzunterbrechung in Mittelspannungsnetzen" (Automatic Reclosing in Medium Voltage Networks), published by AEG, Jun. 1972.

Primary Examiner—A. D. Pellinen
Assistant Examiner—Todd E. DeBoer
Attorney, Agent, or Firm—Spencer & Frank

[57] ABSTRACT

A fault protection system for a power circuit composed of a main current path and a plurality of parallel branch paths connected in series with the main current path and each containing a winding of a medium voltage transformer, which system includes: first and second switchable current interrupters for switching the current flowing through the paths and for protecting the paths against fault currents, the first interrupter being connected in one branch path for interrupting fault currents in a first amplitude range and the second interrupter being connected in the main current path for interrupting fault currents in a second amplitude range which is higher than the first range and includes short circuit currents; and current monitoring circuits connected for monitoring the current in the one branch path and for maintaining the first interrupter in the closed state when the current in the one branch is below the first amplitude range, for placing the first interrupter in the open state in response to the presence of a fault current in the first amplitude range, and for maintaining the first interrupter in the closed state in response to the presence of a fault current in the second amplitude range.

13 Claims, 4 Drawing Sheets

FAULT PROTECTION FOR A MEDIUM VOLTAGE TRANSFORMER BRANCH

BACKGROUND OF THE INVENTION

The present invention relates to fault protection for a medium voltage transformer branches equipped with current interrupters for switching operating currents and for protecting the branch against fault currents.

In most cases, fault protection for medium voltages, e.g. voltages between 5 and 40 kV, is effected by means of a combination of on-load switches with fuses (so-called HH fuses), with the on-load switches taking over the switching in and out of operating currents while the fuses are provided to protect the transformers against excess currents of all types, particularly short-circuit currents.

The use of fuse elements gives rise to serious drawbacks which can be subdivided into thermal problems and insulation problems.

(a) Thermal Problems:

Up to a multiple of the rated fuse current, no reliable current interruption takes place. However, in this current range, the fuses are thermally overloaded and they may burst, resulting in subsequent interfering arcs in the switching systems, or become a source of combustion for the surrounding insulating members.

Such thermal stresses also result in spreading of the fuse characteristics. Changes in the characteristics are also produced by lighting strikes which do not immediately cause the fuse to be blown and by frequent switch-on processes. The consequence of such changes in characteristics in three-phase faults may be single-phase fuse interruptions. During the subsequent opening of the on-load switch, the two other phases must be turned off by the on-load switch. However, many of the introduced on-load switch principles are not suitable for such fault current interruptions which usually coincide with a low cos $\phi$.

(b) Insulation Problems:

The fuses customarily installed in air or air-solid insulations are often the cause of malfunctions primarily in small, not air-conditioned network stations. Therefore, attempts have been made in the past to install so-called $I_k$ interrupters in oil-filled transformers. Details of these problems are described in "Fabrikfertige, typgeprüfte, vollisolierte Kompaktstationen mit Transformatoren and $I_k$-Unterbrechern" [Factory Ready, Type Tested, Fully Insulated Compact Stations Including Transformers and $I_k$ Interrupters], Elektrizitätswirtschaft [Electrical Economics], Volume 83 (1984) No. 7, pages 318–321.

However, the transformers employed for this purpose are special structures and are not acceptable to a number of customers. These solutions cannot be used at all by customers in many countries.

To improve the problem of availability of the switching systems, fully encapsulated, low-maintenance on-load switching systems, e.g. those insulated with $SF_6$, have been developed in recent years. However, for maintenance reasons, the fuse elements employed for the transformer branch are installed in separate compartments of the switch gear, usually insulated by air or solid insulating materials. This results in a system specific insulation whose problems are described, inter alia, in "Schaltanlage für Ortsnetzverteiler-Stationen mit Vakuumleistungsschaltern" [Local Mains Distribution Stations Employing Vacuum Power Switches], Elektrotechnische Zeitschrift [Electrical Magazine], Volume 106 (1985), No. 10. A further drawback of this concept is the fact that the separate room for the fuses increases the dimensions of the system, as indicated, for example, in German Pat. No. 3,107,911 and counterpart U.S. Pat. No. 4,523,253.

The stated drawbacks are overcome in a prior art $SF_6$ insulated switching system for local network exchange stations in which vacuum power switches are used in the transformer branch instead of the combination of on-load switches with fuses. This switching system is described in greater detail in the last paragraph of the above-cited paper. The vacuum power switch then interrupts all operating and fault currents that may be generated in the transformer due to interference and also in the primary input line. However, due to the high costs for the vacuum power switches, this solution must be considered uneconomical for use in network stations.

The problem behavior of high voltage, high power fuses is also referred to in FRG-OS No. 2,315,496, which proposes to solve these problems with an electronic circuit which causes actuation of the on-load switch in the critical current range of the fuses and thus prevents their being overloaded.

However, the protection against greater interference currents and short-circuit currents is left up to the fuses so that all disadvantageous insulation problems and questions of switching system dimensions remain in existence in this solution as well.

SUMMARY OF THE INVENTION

It is an object of the present invention to provide fault protection for a medium voltage transformer branch without fuses and thus provide a solution which is an improvement in an economical respect and which is adapted to operating conditions customary in most exchange networks.

The above and other objects are achieved, according to the invention, by a fault protection system for a power circuit composed of a main current path and a plurality of parallel branch paths connected in series with the main current path and each containing a winding of a medium voltage transformer, the system comprising: first and second current interrupter means for switching the current flowing through the paths and for protecting the paths against fault currents, each interrupter means being bidirectionally switchable between a closed, current conducting, state and an open, current blocking, state, the first interrupter means being connected in one branch path for interrupting fault currents in a first amplitude range and the second interrupter means being connected in the main current path for interrupting fault currents in a second amplitude range, which second amplitude range is higher than the first range and includes short circuit currents; and current monitoring and switching control means connected for monitoring the current in the one branch path and connected to the first interrupter means for maintaining the first interrupter means in the closed state when the current in the one branch is below the first amplitude range, for placing the first interrupter means in the open state in response to the presence of a fault current in the first amplitude range, and for maintaining the first interrupter means in the closed state in response to the presence of a fault current in the second amplitude range.

More advanced medium voltage on-load switches are known which do have sufficient switching capabilities to be able to interrupt not only the operating currents but also, within a certain range, fault currents occurring in transformer branches. This is applicable particularly for modern switches equipped with SF6 quenching devices or vacuum onload switching tubes. Such switches are able to switch off almost all faults occurring in the transformer; for small 24 kV network transformers, the fault currents may be up to several hundred A with a $\cos \phi = 0.3$. Short circuits in the input leads between switching system and transformer, for example in 24 kV mains, may reach values of 10 kA and more, which on-load switches are unable to interrupt.

The probability of such faults, however, is kept low if the switching system is disposed in network station buildings or encapsulations directly adjacent the transformer, so that the connecting lines are short and are not subjected to the environmental conditions existing outside the building.

According to the present invention, such short circuits are interrupted by the power switch provided as short-circuit protection for the higher order network section, e.g. the entire ring circuit, with the on-load switch immediately thereafter severing the faulty branch without current and the power switch connecting the remaining part of the network section, which is free of faults, back into the network. According to another feature of the invention, the current dependent actuation of the on-load switch is effected by means of a very simple monitoring device which operates with low control power. The invention will be described in further detail with reference to the drawing.

DESCRIPTION OF THE PREFERRED EMBODIMENTS

Figure 1:
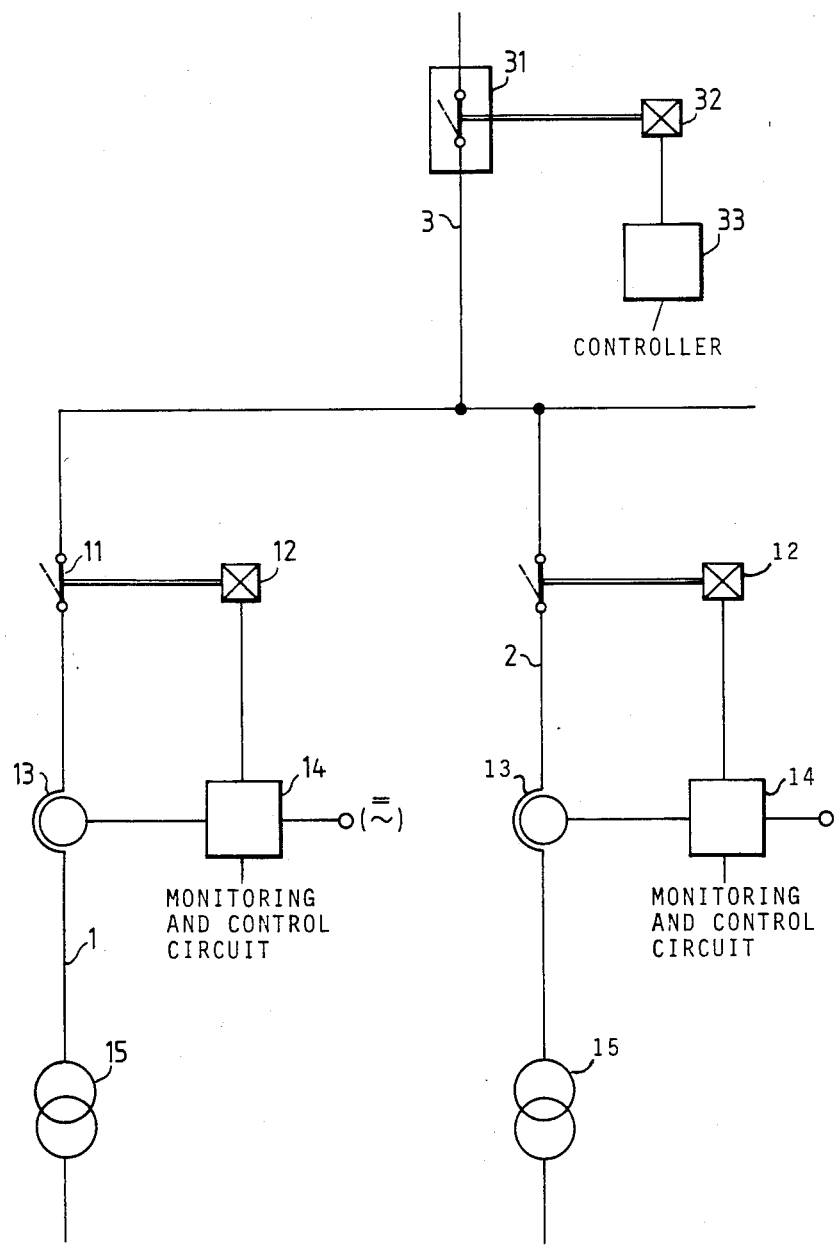
FIG. 1 is a basic single-pole circuit diagram of a network section according to the invention including a power switch and a plurality of transformer branches.

The network section shown in FIG. 1 is composed of two identical transformer branches 1 and 2 which may be connected in parallel with further loads and an input 3 equipped with a power switch 31. For operation of transformer 15, each transformer branch comprises an on-load switch 11 with associated energy store 12, in-phase coupled current converters, or transformers, 13 and an electronic monitoring device 14 connected ahead of the energy store 12. A known relay combination 33 suitable for automatic reclosing acts on energy store 32 of power switch 31. Current converters 13 are configured as toroidal core converters having a very low core power; they may also be replaced by current sensors.

Figure 2:
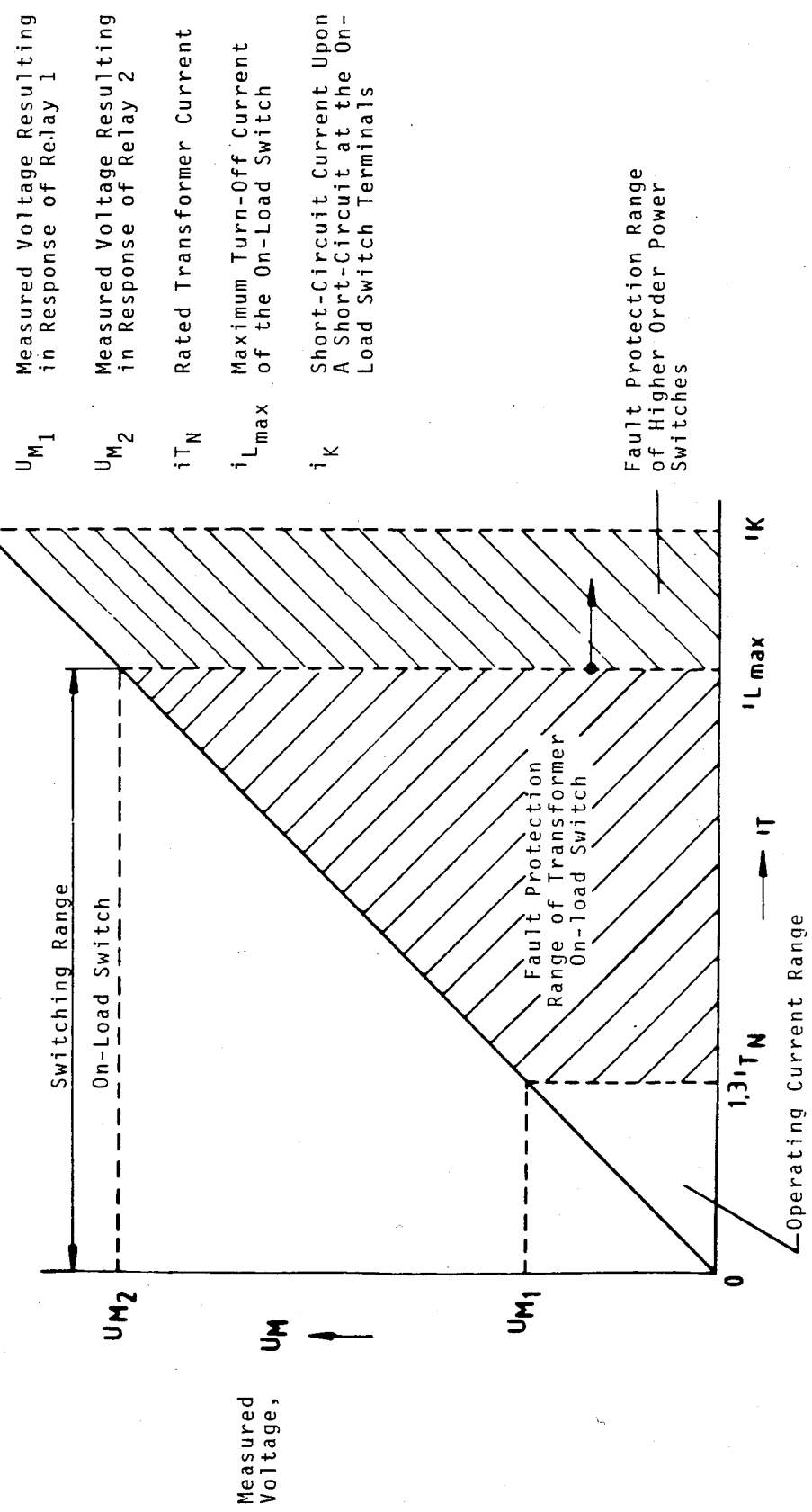
FIG. 2 is a diagram illustrating the operating range of the on-load switch for a transformer branch.

As shown in FIG. 2, on-load switch 11 has a switching capability which covers the operating current range of the transformer and the lower fault protection range. The lower fault protection range begins with a current corresponding to 1.3 times the rated transformer current and ends at the highest permissible turn-off current $i_{Lmax}$ of the on-load switch. Even greater fault currents are associated with the upper fault protection range; they are interrupted by the connected power switch 31.

Figure 3:
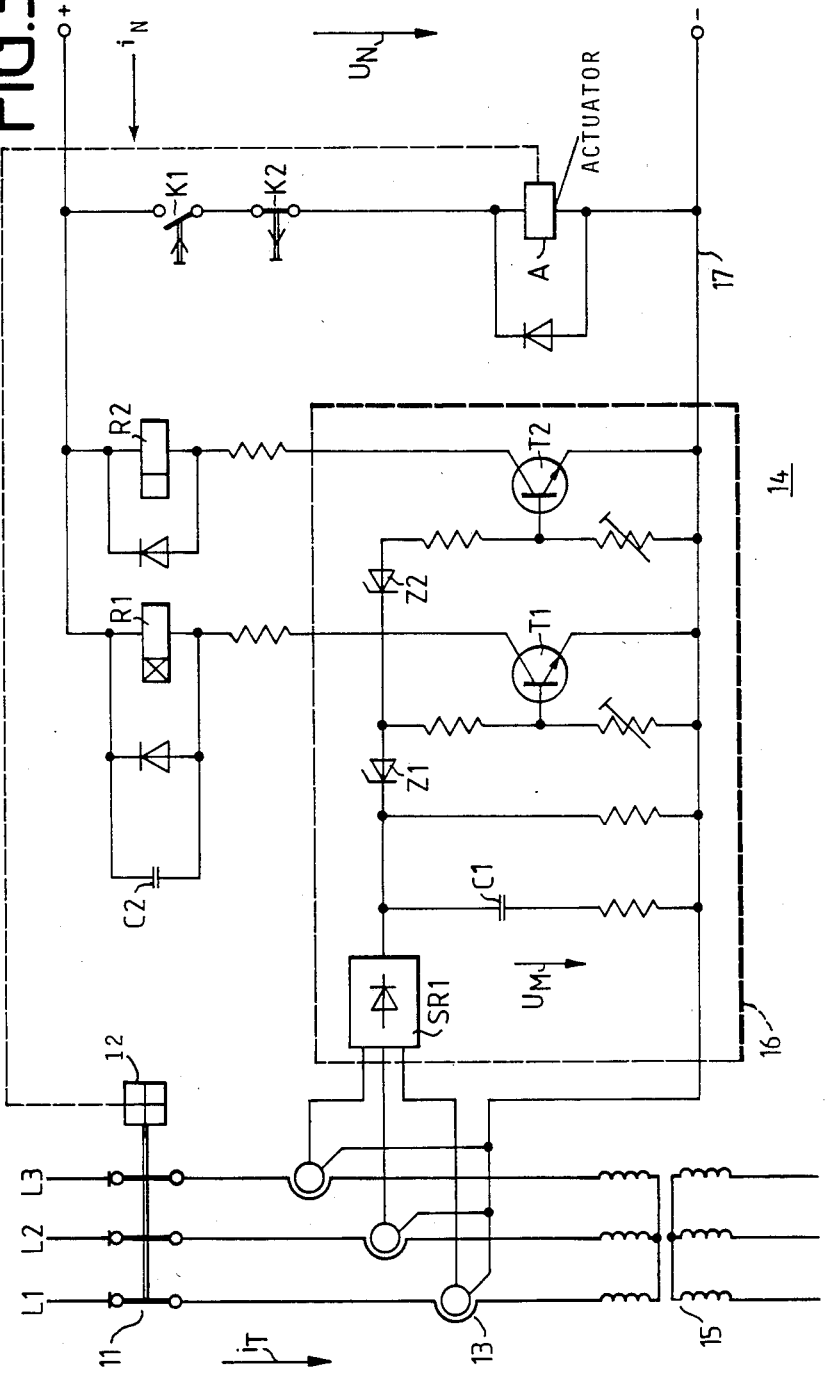
FIG. 3 is a circuit diagram of a monitoring device for the on-load switch according to the invention.

According to FIG. 3, electronic monitoring device 14 is composed of a monitoring circuit 16 and a control circuit 17. A storage capacitor C1 is charged via static converters SR1 by toroidal core current converters 13, thus producing a measured voltage $U_M$ proportional to current $i_T$ across capacitor C1. Two setting members T1 and T2 which can be turned on by way of threshold elements Z1 and Z2 have input terminals connected in parallel with storage capacitor C1. Advantageously, the threshold elements Z1 and Z2 may be configured as Zener diodes and the setting members T1 and T2 as transistors.

The current provided by converters SR1 depends on the form of the bridge connection of their individual diodes and corresponds to a superposition of the three phase currents $i_T$.

According to the present invention, threshold element Z1, which is associated with setting member T1 in the first branch, responds to turn on member T1 when there is a voltage $U_{M1}$ which is slightly higher than that which corresponds to 1.3 times the rated transformer current (1.3 $i_{TN}$) and threshold element Z2, which is associated with setting member T2 in the second branch, responds to turn on member T2 at a voltage slightly below the voltage $U_{M2}$ corresponding to the maximum turn-off current $i_{Lmax}$ of the on-load switch 11.

The electrodes of setting members T1 and T2 each cooperate with a respective relay R1 and R2 belonging to control circuit 17. A capacitor C2 is connected across relay R1 to give relay R1 a delayed action. Relay R2, on the other hand, is fast-acting.

Control circuit 17 is advantageously supplied with an operating voltage $U_N$ by an independent auxiliary energy source, e.g. a direct or alternating current mains. In the branch of actuator A for on-load switches 11, there are two contacts K1 and K2 which are connected in series with actuator A. Contact K1 is here configured as a normally open contact of the delayed-action relay R1, and contact K2 is configured as a normally closed contact of the undelayed relay R2. The two relays R1 and R2 are disposed in two further branches of the control circuit which are arranged in parallel with actuator A. Each relay is connected in series with the output terminals of a respective one of setting members T1 and T2.

Upon the occurrence of a permanent fault in the lower fault protection range, between 1.3$i_{TN}$ and $i_{Lmax}$, a voltage greater than $U_{M1}$ and less than $U_{M2}$ is applied to capacitance C1 so as to fire threshold element Z1 and thus cause setting member T1 to switch through. The current $i_N$ supplied from the mains now actuates relay R1 with a delay and closes switch K1 and thus the circuit of actuator A. On-load switch 11 now opens to interrupt the fault current by means of energy store 12, whereupon relay R1 turns off and monitoring device 14 is returned to its initial state. The delay provided at relay R1 here prevents current interruptions caused merely by the turn-on surge current of the transformer.

If a fault current greater than $i_{Lmax}$ occurs in transformer branch 1, a voltage greater than $U_{M2}$ is present at capacitor C1 and will cause both threshold elements Z1 and Z2 to fire. Then, the two setting members T1 and T2 are switched through and the two relays R1 and R2 are actuated. The undelayed opening contact K2 opens to interrupt the circuit of actuator A before the delayed closing contact K1 closes. Actuator A thus remains without current and onload switch 11 remains switched on.

At the same time, the fault current excites the relay combination 33, resulting in opening of power switch 31, thus interrupting the fault current. Then the voltage across capacitor C1 quickly decreases and setting members T1 and T2 interrupt the supply of actuating current to connection relays R1 and R2. Then opening contact K2 closes before closing contact K1 is able to open due to the delayed dropping of relay R1; actuator A is excited and on-load switch 11 separates the faulty transformer branch from the network before power switch 31 switches on again.

According to a further feature of the invention, circuit 17 for actuation of power switch 11 can also be reliably fed by a capacitor charged from any desired mains if there is a temporary voltage breakdown in the network. The capacitor may here be charged by a suitable voltage derived from the input leads of transformer 15.

Figure 4:
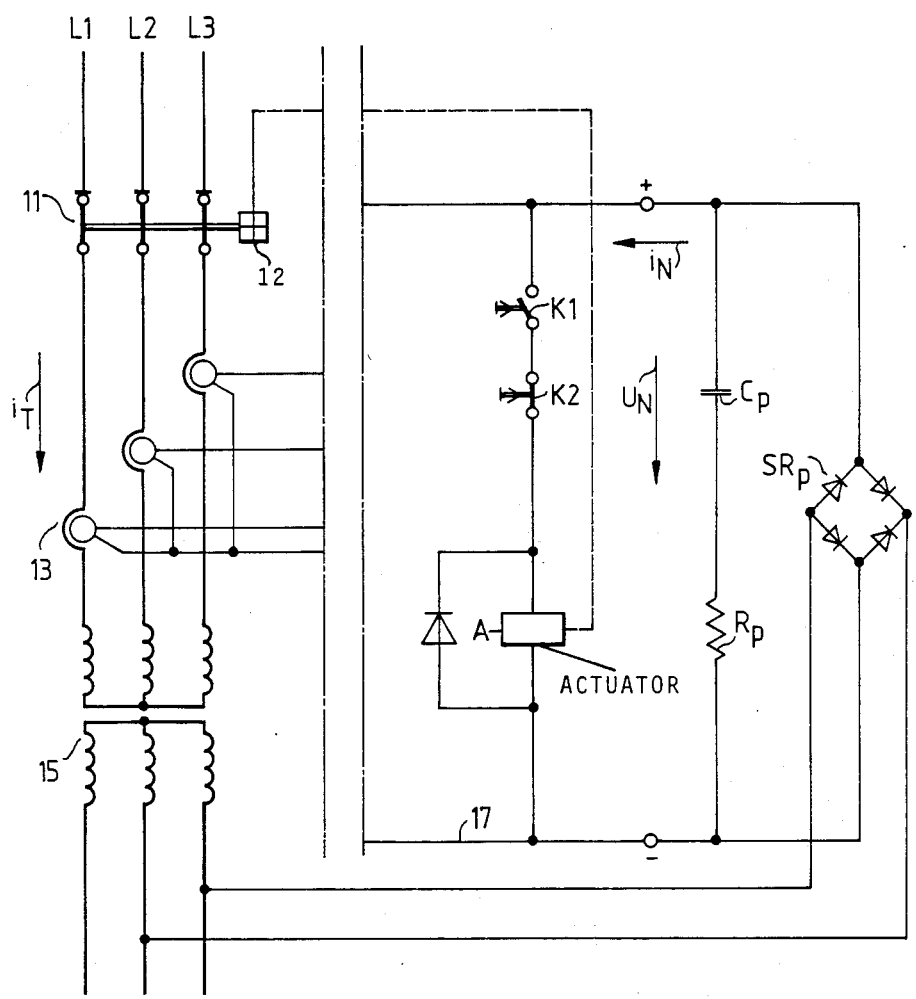
FIG. 4 is a circuit diagram illustrating the supply of power to the actuator circuit from the mains transformer.

FIG. 4 shows the required circuitry for supplying operating power to circuit 17 in the above manner. Capacitor $C_p$, which is connected in parallel with the one branch equipped with actuator A, is charged from the low voltage side of transformer 15 via rectifier $SR_p$. If transformer 15 is switched off in the case of a short circuit, the energy stored in capacitor $C_p$, which slowly decays via resistor $R_p$, is used to power actuator A and thus open load switch 11.

Load switch 11 is actuated by a drive 12 (FIG. 1) equipped with a memory drive acting in the opening direction and actuated, in the case of malfunction, via an electromagnetic actuator A (FIG. 3). For turn-on, a simple trip spring mechanism is employed which is tensioned and actuated by means of a lever or a motor drive (remote actuation). The turn-on process is always intentional and independent of the sequences described herein.

Such a drive is disclosed in German Patent application DE-AS No. 1,948,209.

An electromagnetic actuator A as shown in FIG. 3 may also act on control shaft 36 of the above-cited publication. Such an actuator is also disclosed, for example, in German Pat. No. 1,008,387, where it is designated by reference numeral 23.

An example of an energy store 32 for power switch 31 is disclosed in German Pat. No. 1,008,387. This energy store is suitable for so-called automatic reclosing circuits or temporary interruptions as required when interrupting a fault current $i_K > i_{Lmax}$.

The relay combination 33 for automatic reclosing is described in greater detail, for example in the publication "Kurzunterbrechung in Mittelspannungsnetzen" [Automatic Reclosing in Medium Voltage Networks], published by AEG.

The invention now being fully described, it will be apparent to one of ordinary skill in the art that many changes and modifications can be made thereto without departing from the spirit or scope of the invention as set forth herein.

What is claimed is:

1. In a power circuit composed of a main current path and a plurality of parallel branch paths connected in series with the main current path and each containing a winding of a medium voltage transformer, a fault protection system comprising: first and second current interrupter means for switching the current flowing through the paths and for protecting the paths against fault currents, each said interrupter means being bidirectionally switchable between a closed, current conducting, state and an open, current blocking, state, said first interrupter means being connected in one branch path for interrupting fault currents in a first amplitude range and said second interrupter means being connected in the main current path for interrupting fault currents in a second amplitude range, which second amplitude range is higher than the first range and includes short circuit currents; and current monitoring and switching control means connected for monitoring the current in the one branch path and connected to said first interrupter means for maintaining said first interrupter means in the closed state when the current in the one branch is below the first amplitude range, for placing said first interrupter means in the open state in response to the presence of a fault current in the first amplitude range, and for maintaining said first interrupter means in the closed state in response to the presence of a fault current in the second amplitude range.

2. A fault protection system as defined in claim 1 wherein said first current interrupter means used in the one branch path is an on-load switch having a switching capability which is able to cover at least the first amplitude range and said second current interrupter means is a higher-order switch having a switching capability which is able to cover all short circuit currents occurring in the main current path.

3. A fault protection system as defined in claim 2 further comprising further control means connected for controlling said second interrupter means in response to a current in the second amplitude range through the one branch path and the main path for switching said second interrupter means into the open state in response to the presence of the current in the second amplitude and for then switching said second interrupter means back to the closed state after said first interrupter means has been switched to the open state.

4. A fault protection system as defined in claim 3 wherein said further control means comprise a relay device operative for placing said second interrupter means in the open state for a short period.

5. A fault protection system as defined in claim 3 wherein said further control means are operative to maintain said second interrupter means in the open state until after said first interrupter means has been switched into the open state.

6. A fault protection system as defined in claim 1 wherein said monitoring and control means comprise: current sensing means coupled to the one branch path; monitoring circuit means connected to said current sensing means for producing signals representative of the current in the one branch; control circuit means connected to said monitoring circuit means and having output means operative in response to the signals produced by said monitoring circuit means; an actuator connected to said output means of said control circuit means and to said first interrupter means for controlling the switching of said first interrupter means in response to the operation of said output means; and an independent source of operating power for said monitoring and control means.

7. A fault protection system as defined in claim 6 wherein the transformer has a rated transformer current, said first interrupter means is constructed to be switched to the open state without damage while conducting a current not exceeding a maximum turn-off current value, and said monitoring circuit means comprise: a static converter connected to produce a current dependent on the currents in all of the branch paths; a storage capacitor connected to said converter to be charged to a voltage proportional to the current produced by said static converter; first and second setting elements each having an input and an output for providing one of the signals produced by said monitoring circuit means in response to the presence of a predetermined voltage at said input; first and second threshold elements connected between said capacitor and said inputs of setting elements for causing said first setting element output to provide a signal when the voltage across said capacitor is proportional to a current which is greater than 1.3 times the rated transformer current and for causing said second setting element output to provide a signal when the voltage across said capacitor is proportional to a current which is slightly less than the maximum turn-off current value.

8. A fault protection system as defined in claim 7 wherein said threshold elements are Zener diodes and said setting members are transistors.

9. A fault protection system as defined in claim 7 wherein said control circuit means comprise two relays each having a switchable contact, said relays being actuable in response to the signals produced by said monitoring circuit means.

10. A fault protection system as defined in claim 9 wherein a first one of said relays is a delayed-acting relay having a normally open contact, a second one of said relays is a non-delayed acting relay and has a normally closed contact, and said actuator is connected in series with said contacts of said first and second relays for switching said first interrupter means to the open state only when both of said contacts are closed.

11. A fault protection system as defined in claim 10 wherein said source of operating power includes rectifiers supplied by a current supply mains, and said control circuit is composed of: a first branch containing said actuator and said contacts; a second branch connected in parallel with said first branch and containing said second relay connected in series with said second setting element output; and a third branch connected in parallel with said first branch and containing said first relay connected in series with said first setting elememt output.

12. A fault protection system as defined in claim 10 wherein, upon the occurrence of a fault current in the second amplitude range, the closing time of said contact of said first relay is longer than the time during which said second interrupter means is in the open state.

13. A fault protection system as defined in claim 6 wherein said source of operating power comprises a capacitor-resistor circuit connected to be charged via rectifiers from a power supply mains for assuring continued operation of said monitoring and control means in the event of brief interruptions in the supply of power by the mains.

* * * * *